H. F. PETER, W. A. KLINGE, P. ASSMAN & G. SCHWEIKERT
VENT-VALVES FOR CASKS, &c.
No. 184,795.  Patented Nov. 28, 1876.
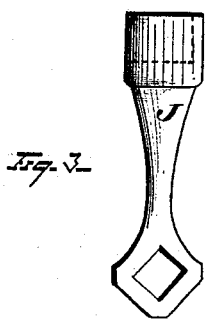
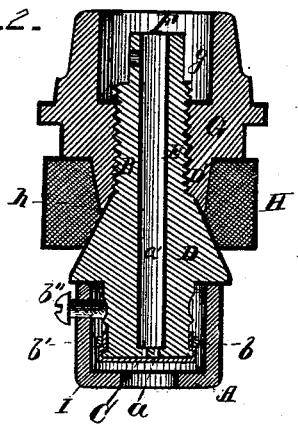
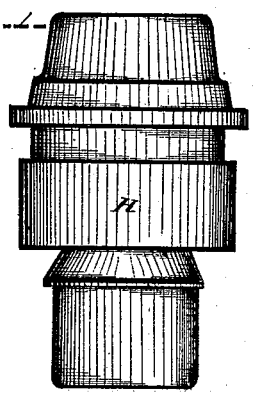

UNITED STATES PATENT OFFICE.

HERMAN F. PETER, WILLIAM A. KLINGE, PAUL ASSMAN, AND GEORGE SHWEIKERT, OF LANCASTER, OHIO.

IMPROVEMENT IN VENT-VALVES FOR CASKS, &c.

Specification forming part of Letters Patent No. 184,795, dated November 28, 1876; application filed April 13, 1876.

*To all whom it may concern:*

Be it known that we, HERMAN F. PETER, WILLIAM A. KLINGE, PAUL ASSMAN, and GEORGE SHWEIKERT, of Lancaster, in the county of Fairfield and State of Ohio, have invented certain new and useful Improvements in Vent-Valves for Casks, &c.; and we do hereby declare the following to be a full, clear, and exact description of the invention, such as will enable others skilled in the art to which it pertains to make and use it, reference being had to the accompanying drawings, which form part of this specification.

Our invention relates to an improved vent-valve for casks, &c.

The invention consists, first, in the combination, with a perforated valve-seat, formed on the end of a screw-threaded stem, of an elastic valve and strap or holder, to admit air to a cask, barrel, or other receptacle; second, in the combination, with the valve-seat and its stem, of a guard or cap, removably secured to the stem of the valve-seat by a set-screw, whereby the valve is protected and its displacement prevented; third, in the combination, with the stem of the valve-seat, constructed with a conical bearing, of a nut having a conical bearing and an interposed elastic ring, whereby the ring may be set out by forcing the conical bearings toward each other.

Figure 1 is a side elevation of our improved vent-valve. Fig. 2 is a vertical section of the same, and Fig. 3 represents the key.

A represents the valve-seat, provided with one or more perforations, $a$, the same merging into a passage, $a'$, extending through the entire length of the stem B. The valve C consists of a thin strip of rubber, and the same is secured against the surface of the valve-seat by an elastic strap, $b$, which fits within a groove, $b'$, formed in the neck of the valve-seat.

In order to protect the elastic valve from possible displacement, the guard or cap I is placed over the valve, and secured to the stem by a set-screw, $b''$.

The stem B is formed with a conical bearing, D, and a screw-threaded portion, E, having a squared end, F. G is a nut, countersunk at $g$, and constructed with a conical bearing, D'.

An elastic washer or ring, H, made with its opening $h$ of about the same diameter as the inner ends of the conical bearings D D', is placed upon said bearings.

The operation of the device is as follows: The valve having been properly adjusted, and the cap I secured over the same by the set-screw, the device is inserted into the bung-hole of a barrel or cask, and the rubber ring or washer will snugly fit within the hole. By applying the key J to the squared end F the conical bearings D D' are forced toward each other, and operate to expand the elastic washer or ring, to constitute an air-tight joint between the same and the cask.

The squared end of the valve-stem is completely inclosed within the countersunk portion of the nut, and hence cannot receive damage while the cask is in transit.

The valve serves to admit air to the cask, and supply the vacuum therein occasioned by drawing off its contents.

The device may be made of metal or wood, and constitutes a permanent fixture in the cask to which it is attached.

Ordinarily, air is supplied to beer casks or kegs by means of costly and complicated faucets, and these are not necessary when the vent-valve above described is attached to the keg; but a simple and inexpensive wooden faucet will answer the desired purpose.

Having fully described our invention, what we claim as new, and desire to secure by Letters Patent, is—

1. The combination, with a perforated valve-seat, formed on the end of a screw-threaded stem, of an elastic valve and strap or holder, substantially as and for the purpose set forth.

2. The combination of a removable guard or cap with the valve-seat and its stem, substantially as and for the purpose specified.

3. The combination of an elastic ring or washer with the stem of the valve-seat and the nut, each of which is provided with conical bearings, substantially as and for the purpose specified.

In testimony that we claim the foregoing we have hereunto set our hands this 11th day of April, 1876.

HERMAN F. PETER.
  WILLIAM A. KLINGE.
  PAUL ASSMAN.
  GEORGE SHWEIKERT.

Witnesses:
 VALENTIN MAYER,
 CHARLES K. DRINKLE.